(12) United States Patent
Breu et al.

(10) Patent No.: US 11,508,977 B2
(45) Date of Patent: Nov. 22, 2022

(54) SUPPLY DEVICE HAVING A FUEL CELL DEVICE AND A BATTERY, AND METHOD FOR FROST-STARTING A SUPPLY DEVICE

(71) Applicant: Audi AG, Ingolstadt (DE)

(72) Inventors: Martin Breu, Münster/Steinach (DE); Maximilian Schiedermeier, Ingolstadt (DE)

(73) Assignee: Audi AG, Ingolstadt (DE)

( * ) Notice: Subject to any disclaimer, the term of this patent is extended or adjusted under 35 U.S.C. 154(b) by 64 days.

(21) Appl. No.: 16/965,937

(22) PCT Filed: Oct. 26, 2018

(86) PCT No.: PCT/EP2018/079404
§ 371 (c)(1),
(2) Date: Jul. 29, 2020

(87) PCT Pub. No.: WO2019/145059
PCT Pub. Date: Aug. 1, 2019

(65) Prior Publication Data
US 2021/0075037 A1 Mar. 11, 2021

(30) Foreign Application Priority Data
Jan. 29, 2018 (DE) ...................... 10 2018 201 260.1

(51) Int. Cl.
*H01M 8/04* (2016.01)
*H01M 8/04223* (2016.01)
*B60L 58/34* (2019.01)
*B60L 58/40* (2019.01)
*B60L 58/31* (2019.01)
(Continued)

(52) U.S. Cl.
CPC ......... *H01M 8/04253* (2013.01); *B60L 50/75* (2019.02); *B60L 58/31* (2019.02); *B60L 58/34* (2019.02); *B60L 58/40* (2019.02); *H01M 8/0432* (2013.01); *H01M 8/04037* (2013.01); *H01M 8/04268* (2013.01);
(Continued)

(58) Field of Classification Search
CPC ......... H01M 8/04037; H01M 8/04253; H01M 8/04268; H01M 8/0432; H01M 8/04873; B60L 58/31; B60L 58/34; B60L 58/40
USPC ........................................................ 429/9
See application file for complete search history.

(56) References Cited

U.S. PATENT DOCUMENTS

| | | |
|---|---|---|
| 2008/0187802 A1 | 8/2008 | Andreas-Schott et al. |
| 2008/0241608 A1 | 10/2008 | Zhang et al. |
| 2017/0229729 A1 | 8/2017 | Elliott et al. |

FOREIGN PATENT DOCUMENTS

| | | |
|---|---|---|
| DE | 10 2015 109 502 A1 | 12/2015 |
| DE | 10 2014 224 574 A1 | 6/2016 |

(Continued)

*Primary Examiner* — James M Erwin
(74) *Attorney, Agent, or Firm* — Seed IP Law Group LLP

(57) ABSTRACT

A supply device for the electrical supply of at least one consumer has a primary current system in which there is a fuel cell device, a secondary current system in which there is a battery which has an operating voltage range limited at the top by a maximum voltage and at the bottom by a minimum voltage and which has an operating current strength range for supplying current to the at least one consumer, and a frost-starting element, which is provided in the primary current system and is designed to bring about heating of the fuel cell device. An open-circuit voltage of the fuel cell device corresponds at most to the maximum voltage of the battery.

8 Claims, 1 Drawing Sheet

(51) Int. Cl.
*B60L 50/75* (2019.01)
*H01M 8/04007* (2016.01)
*H01M 8/0432* (2016.01)
*H01M 8/04858* (2016.01)
*H01M 16/00* (2006.01)

(52) U.S. Cl.
CPC ..... *H01M 8/04873* (2013.01); *H01M 16/006* (2013.01); *H01M 2220/20* (2013.01); *H01M 2250/20* (2013.01)

(56) References Cited

FOREIGN PATENT DOCUMENTS

DE  10 2015 206 423 A1  10/2016
EP  1 068 998 A2  1/2001

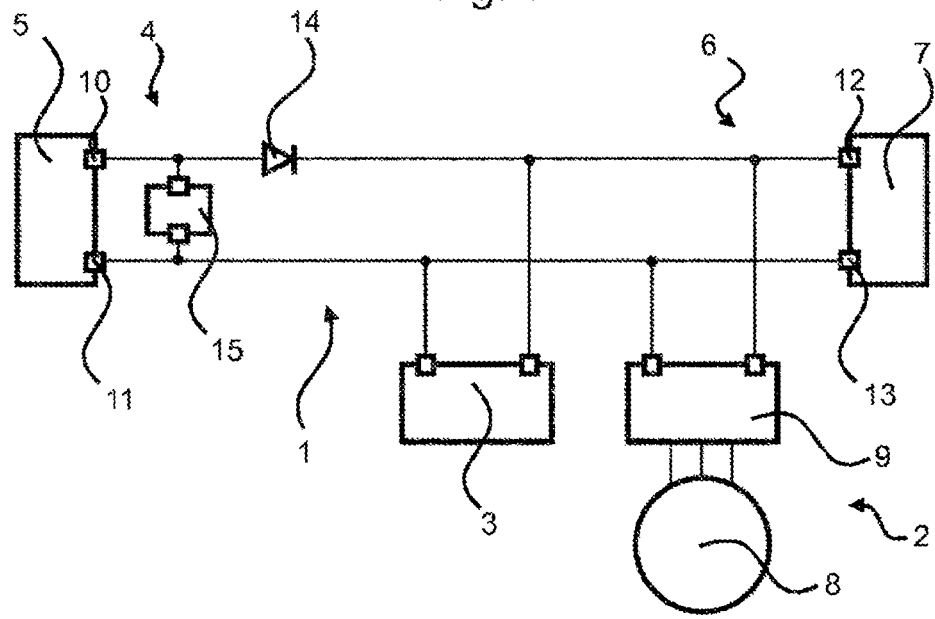
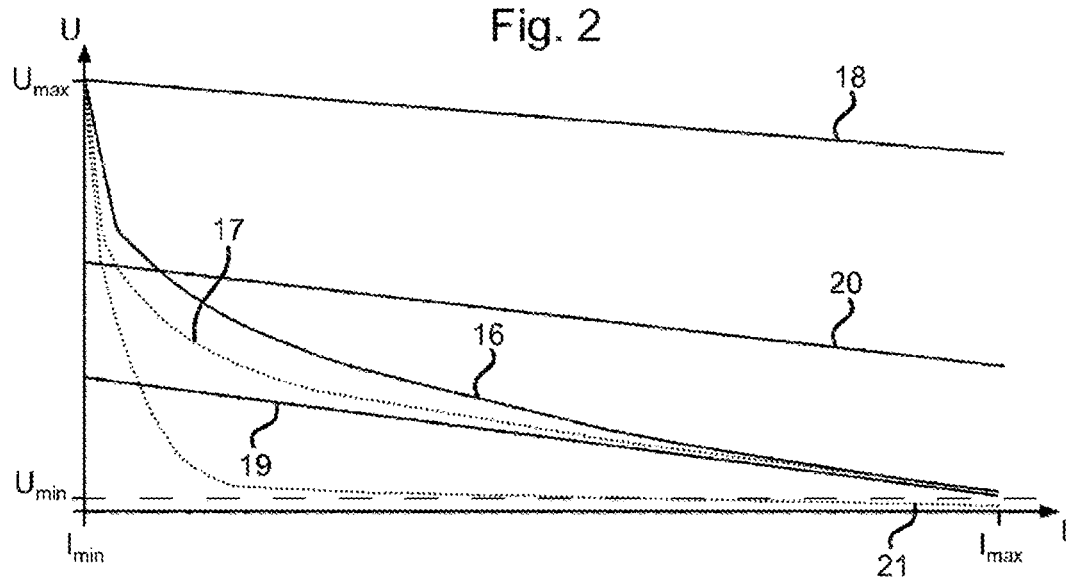

SUPPLY DEVICE HAVING A FUEL CELL DEVICE AND A BATTERY, AND METHOD FOR FROST-STARTING A SUPPLY DEVICE

BACKGROUND

Technical Field

Embodiments of the invention relate to a supply device for the electrical supply of at least one consumer, comprising a primary current system in which there is a fuel cell device. The supply device further comprises a secondary current system, in which there is a battery having an operating voltage range limited at the top by a maximum voltage and at the bottom by a minimum voltage. Furthermore, the battery comprises an operating current strength range for supplying current to the at least one consumer. A frost-starting element is provided in the primary current system, which is designed to bring about the heating of the fuel cell device. Embodiments of the invention further relate to a method for frost-starting a supply device.

Description of the Related Art

If the supply device is used in motor vehicles, it is subject to a wide variety of weather conditions. It is known that low temperatures below the freezing point of water can cause considerable problems when starting a fuel cell device in a supply device. For example, in frost conditions, the anode spaces and/or the cathode spaces may be blocked by ice, such that operating media are not available to the anodes and/or cathodes of the fuel cell device to an extent as desired. However, frost can also lead to malfunctions of actuators, such as flaps, valves or the like, on the inlet and outlet side of the fuel cell device, or can cause clogging of the lines in which the operating media run.

Thus, if there is a risk of a frost start, for example if the ambient temperature is below 5 degrees Celsius, the fuel cell device and thus the supply device comprising the fuel cell device is operated in a frost-start mode before it can switch to normal operation. The frost-starting element is used in this case to enable a frost start of the fuel cell device or supply device and to thus bring about heating of the fuel cell device.

DE 10 2015 206 423 A1 also deals with the problem of frost starting, wherein an element is provided which serves for short-circuiting the cathode with the anode within the fuel cell device. A polarity reversal of individual cells of the fuel cell device can be brought about by this short-circuiting if flow channels of the anode or of the cathode were blocked as a result of ice formation.

DE 10 2015 109 502 A1 describes an apparatus and a method for heating a fuel cell stack. Here, an IGBT (insulated-gate bipolar transistor) is connected in parallel to the fuel cell device to draw current from the fuel cell device and thereby generate heat for the fuel cell device. A tube guiding a medium is positioned around the IGBT so as to heat the medium therein. The tube extends around the fuel cell stack, thereby utilizing the heated medium to heat the fuel cell stack.

Such known solutions for realizing a frost start provide for a primary current system which is always connected to the secondary current system via a DC/DC converter (voltage converter or converter). The use of the voltage converter, however, leads to additional weight and additional installation space which must be provided for the supply device.

BRIEF SUMMARY

A supply device for the electrical supply of at least one consumer, may have a structure that is as simple as possible and at the same time allows a reliable frost start. A method for frost-starting a fuel cell device of such a supply device may switch the supply device in a simple manner to normal operation.

The frost-starting element in turn serves to heat the fuel cell device, which can be electrically connected to the secondary current system of the battery without a DC/DC converter. This makes it possible to provide a compact module of a supply device which has a simplified structure.

A drive device with a drive unit (for example) may be used as a consumer. When electrically connected to the secondary current system, it can be used to drive a motor vehicle, i.e., to provide a drive torque directed to driving the motor vehicle. For this purpose, the drive device comprises at least one drive unit designed as an electric machine and can be provided with electrical energy via the primary current system and/or the secondary current system. Naturally, the drive device can be designed as hybrid drive device and, in this respect, have at least one further drive unit in addition to the drive unit that is of a different type than the drive unit. The further drive unit is provided, for example, as a combustion engine or the like.

The primary current system and the secondary current system may form an on-board electrical system of the motor vehicle or constitute at least one region of such an on-board electrical system. A first current source in the form of the fuel cell device is provided in the primary current system, and a second current source in the form of the battery is provided in the secondary current system. The fuel cell device may be in the form of a single fuel cell or alternatively in the form of a fuel cell stack having multiple fuel cells. The fuel cell device serves for reliably supplying electrical energy to the on-board electrical system. The battery also serves to reliably supply the on-board electrical system with electrical energy and is provided for temporarily storing the energy, in particular energy which was provided by means of the fuel cell device.

The consumer, i.e., the electric machine, is electrically connected to the secondary current system and may be permanently electrically connected to the battery during a driving operation of the motor vehicle. The connection of the consumer in the form of a drive unit to the secondary current system can be realized, for example, via a converter, in particular a pulse-controlled inverter.

It has proven to be advantageous if the frost-starting element is connected parallel to the fuel cell device and if the frost-starting element is designed to withdraw a current from the fuel cell device in order to lower the fuel cell voltage below a predetermined or predeterminable voltage limit value. The low voltage of the fuel cell device produces more heat from the individual fuel cells per gram Hz. Heretofore, it has been possible to withdraw large currents from the fuel cell device with a DC/DC converter, in order to bring about the internal heating of the fuel cell device due to the low voltage. However, since the voltage converter may be omitted, the frost-starting element is used to lower the voltage within the fuel cell device below the voltage limit value, such that the automatic heating of the fuel cell device takes place.

The primary current system may have a first primary current system connection and a second primary current system connection, wherein the frost-starting element is connected to the first primary current system connection at one end and to the second primary current system connection at the other end. The secondary current system further comprises a first secondary current system connection and a second secondary current system connection, wherein the first primary current system connection and the first secondary current system connection are connected via a blocking diode and the second primary current system connection and the second secondary current system connection are connected directly to one another. The same electrical potential is thus provided at the second primary current system connection and the second secondary current system connection. The first primary current system connection and the first secondary current system connection, on the other hand, are only indirectly connected to each other via the blocking diode. The fuel cell device and the battery are matched to one another and allow for an extremely efficient operation of the supply device, which is moreover distinguished by a very simple and cost-efficient design, since a voltage converter is dispensed with. In this connection, it has therefore proven to be advantageous if the primary current system is connected to the secondary current system without voltage conversion.

The blocking diode may have its forward direction from the primary current system in the direction of the secondary current system. Accordingly, electrical energy can pass from the primary current system into the secondary current system when the voltage in the primary current system is sufficiently high. In contrast, the reverse transmission direction is excluded, such that no current from the battery will enter the fuel cell device. Applying an impermissibly high voltage to the primary current system is avoided.

In some embodiments, the battery has a specific number of battery cells and/or that the fuel cell device has a specific number of fuel cells, wherein the number of battery cells and/or the number of fuel cells is selected such that the open-circuit voltage of the fuel cell device corresponds at most to the maximum voltage of the battery. The open-circuit voltage of the fuel cell device essentially corresponds to at least 85% of the maximum voltage, 90% of the maximum voltage, or 95% of the maximum voltage of the battery. Such a configuration makes it possible to adjust the voltage-current characteristic curve of the fuel cell device and battery via the number of battery cells and/or the number of fuel cells of the fuel cell device. Alternatively or additionally, different types of battery cells, for example with different rated voltages, can be used for attuning the characteristic curve of the battery to that of the fuel cell device.

Furthermore, the corresponding selection of the operating current strength range and/or, in turn, the selection of the number and embodiment of battery cells and/or the number and embodiment of the fuel cells or of the type of battery cells ensure that the fuel cell voltage provided by the fuel cell device is greater than the minimum voltage of the battery over the operating current strength range. In this respect, the fuel cell device and the battery are matched to one another solely by easily implementable measures in the design of the fuel cell device and of the battery.

In order to withdraw a large current from the fuel cell device, it has proven to be advantageous if the frost-starting element is formed as a high-voltage resistor that can be switched on and off. In the frost-start mode, the high-voltage resistor is switched on, such that a high current flow takes place from the fuel cell device, which leads to the automatic heating of the individual cells of the fuel cell device. In this connection, the fuel cell device thus supplies a high voltage which can be lowered with the high-voltage resistance below a voltage limit value that leads to automatic heating.

In an alternative embodiment, the supply device is characterized in that the frost-starting element is formed as a PTC (positive temperature coefficient) heating element. This PTC heating element may be formed as a PTC resistor capable of generating heat when the energy is absorbed from the fuel cell device. Thermal contact between the PTC heating element and fuel cell device may utilize the heat generated in the PTC heating element to heat the fuel cell device in addition to automatically heating the fuel cell device based on the low voltage present therein.

Alternatively or additionally, the voltage in the fuel cell device can also be lowered by a frost-starting element which is formed as a Z diode. It is characterized in that it withstands a high current flow, which may be necessary in order to lower the fuel cell voltage below a predetermined or predeterminable voltage limit value and to thus bring about the automatic heating.

Furthermore, it has proven to be advantageous if the frost-starting element is formed as a power semiconductor switch operable in a linear mode. This also makes it possible to withdraw a large amount of current from the fuel cell device, which leads to a lowering of the fuel cell voltage and to the automatic heating of the fuel cell device.

A method may include:
a. determining a condition of a frost start,
b. lowering a fuel cell voltage below a voltage limit value by activating the frost-starting element connected in parallel to the fuel cell device, and
c. deactivating the frost-starting element upon reaching a normal temperature of the fuel cell device.

The determination of a condition of a frost start may be implemented by means of a temperature sensor of a vehicle. After deactivating the frost-starting element, the normal operation of the fuel cell device or the supply device is initiated or started.

BRIEF DESCRIPTION OF THE SEVERAL VIEWS OF THE DRAWINGS

Further advantages, features, and details result from the claims, the following description, and from the drawings. The following are shown:

FIG. 1 is a schematic illustration of a supply device for the electrical supply of at least one consumer in the form of a drive device with drive unit for driving a motor vehicle.

FIG. 2 is a voltage-current characteristic diagram in which voltage-current characteristic curves for a battery with different charge levels and voltage-current characteristic curves of a fuel cell device are plotted.

DETAILED DESCRIPTION

FIG. 1 is a schematic illustration of a supply device 1 for the electrical supply of a first consumer 2 and of a second consumer 3. The present supply device 1 can also supply further consumers, not shown in greater detail, with electrical energy.

The supply device 1 comprises a primary current system 4 in which a fuel cell device 5 is present. Moreover, the supply device 1 comprises a secondary current system 6 in which a battery 7 is present, which has an operating voltage range which is limited at the top by a maximum voltage $U_{max}$ and at the bottom by a minimum voltage $U_{min}$. In addition, the battery 7 has an operating current strength range which is limited at the bottom by a minimum current $I_{min}$ and at the top by a maximum current $I_{max}$. The battery 7 is designed to energize the consumers 2, 3.

The consumer 2 comprises a drive unit 8 present in the form of an electric machine. This electric machine can typically be operated by means of a three-phase alternating current and may be formed as a traction motor for a motor vehicle. Since the primary current system 4 and also the secondary current system 6 supply a high voltage and a direct current, the consumer 2 is additionally assigned the inverter 9 which converts the direct current into the three-phase alternating current. In a further development of the consumer 2, the drive unit 8 can also be used as a generator such that, for example, energy generated by the drive unit 8 during braking can be supplied to the battery 7 via the inverter 9.

The consumer 3 can likewise be connected to the on-board system formed by the primary current system 4 and the secondary current system 6. For example, auxiliary units of the fuel cell device 5, a charger, a 12V DC/DC converter, a high-voltage heater, an electric air-conditioning compressor or the like can be used as consumer 3.

As can be seen from FIG. 1, the primary current system 4 is connected to the secondary current system 6 without a transducer or voltage converter. The primary current system 5 has a first primary current system connection 10 and a second primary current system connection 11. The battery 7 in the secondary current system 6 accordingly has a first secondary current system connection 12 and a second secondary current system connection 13. The first primary current system connection 10 is connected to the first secondary current system connection 12 via a blocking diode 14. In this case, a forward direction of the blocking diode 14 is provided in a direction from the primary current system 4 to the secondary current system 6. In contrast, the second primary current system connection 11 is electrically connected directly to the second secondary current system connection 13.

A frost-starting element 15, which is designed to bring about heating of the fuel cell device 5, is present in the primary current system 4. In the present case, the frost-starting element 15 is connected in parallel to the fuel cell device 5 and is designed to withdraw a current from the fuel cell device 5, in order to lower a fuel cell voltage below a voltage limit value. The fuel cell device 5 automatically heats up due to the low fuel cell voltage in the fuel cell device 5. The frost-starting element 15 may be electrically connected to the first primary current system connection 10 at one end and electrically connected to the second primary current system connection 11 at the other end. Both connections are here direct, such that in particular the blocking diode 14 has no influence on the frost-starting element 15. The frost-starting element 15 can be formed as a PTC heating element, as a Z diode, as a power semiconductor switch operable in a linear mode or as a high-voltage resistor that can be switched on and off. At any rate, the fuel cell voltage of the fuel cell device 5 is lowered below a voltage limit by the frost-starting element 15, thereby causing the fuel cells to heat up automatically within the fuel cell device 5.

FIG. 2 shows a voltage current characteristic diagram, in which a voltage current characteristic curve 16 of the fuel cell device 5 with inactive or deactivated frost-starting element 15 is shown. Furthermore, a first voltage-current characteristic curve 17 and a second voltage-current characteristic curve 21 of the fuel cell device 5 with a different but active frost-starting element 15 are shown as dotted lines. In addition, the voltage-current characteristic curve 18 shows the state of the battery 7 with a high or with a maximum charge level, and the voltage-current characteristic curve 19 shows a low charge level of the battery 7, in particular a minimum charge level. In addition, the voltage-current characteristic curve 20 of the battery 7 exhibits an intermediate, in particular mean, charge level of the battery 7.

The characteristic diagram includes, on the one hand, an operating voltage range and, on the other, an operating current strength range. The operating voltage range is limited at the bottom by a minimum voltage $U_{min}$ and at the top by a maximum voltage $U_{max}$. The operating current strength range is limited at the bottom by a minimum current $I_{min}$ and at the top by a maximum current $I_{max}$. Within the operating current strength range, the voltage provided by the battery 7 is to always be sufficient to properly operate at least one of the two consumers 2, 3. Within the operating current strength range there is thus always a corresponding minimum voltage $U_{min}$ provided.

In the present case, the characteristic curves 16, 17, 21 of the fuel cell device 5 are matched to the operating voltage range and the operating current strength range of the battery 7. This can be achieved by a predetermined number of battery cells and/or a predetermined number of fuel cells within the fuel cell device 5. As an alternative or in addition, different types of battery cells can be used to produce a corresponding tuning. In particular, an open circuit voltage of the fuel cell device 5 corresponds at most to the maximum voltage $U_{max}$ of the battery 7; in particular, it corresponds precisely to the maximum voltage $U_{max}$ of the battery 7. Conversely, the fuel cell voltage provided by the fuel cell device 5 is always or mostly greater over the operating current strength range than the minimum voltage $U_{min}$ of the battery 7. However, this need not necessarily be the case in the special case of a frost start since, here, the fuel cell voltage can also fall below the minimum voltage $U_{min}$ of the battery 7, which in the case of the characteristic curve 21 takes place in sections. In such a case, however, it may happen that the battery 7 then opens its contactors. However, even if the contactors of the battery 7 are not opened, the fuel cell device 5 is still protected due to the blocking diode 14 provided in the primary current system 4. As the current flow increases, the fuel cell voltage may approximate the characteristic curve 19 of the battery 7 asymptomatically for the smallest charge level shown here.

While the solid characteristic curve 16 of the fuel cell device 5 shows the state in which the frost-starting element 15 is inactive, the characteristic curves 17, 21 of the fuel cell device 5 show the state with active frost-starting element 15. Characteristic curve 16 thus shows, for example, the normal operation of the supply device 1 or its fuel cell device 5, wherein the characteristic curve 17 corresponds to a frost-start operation in which the fuel cell voltage does not fall below the voltage level of the battery 7. The characteristic curve 21 shows a fuel cell voltage which drops below the voltage level of the battery 7, in some parts even below the minimum voltage $U_{min}$ of the battery. The characteristic curves 17, 21 thus show a greater drop in fuel cell voltage than the characteristic curve 16 which corresponds to normal operation. Thus, in the case of active frost-starting element 15, the fuel cell voltage is subject to a greater drop compared to the fuel cell voltage during normal operation. As a result, the fuel cell device 5 heats up automatically. When a predetermined temperature is reached, for example when 5 degrees Celsius are reached, the frost-starting element 15 can be switched to inactive, such that the characteristic curve 16 tunes in and the supply device switches from frost-start operation to normal operation.

With such an embodiment, a very efficient operation of the supply device 1 can be ensured. The same also applies to a drive device which is supplied with electrical energy with such a supply device 1. Moreover, the supply device 1 can be embodied in a very simple manner, such that installation space and cost advantages result when used in a motor vehicle.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A supply device for electrical supply of at least one consumer, said supply device comprising:
   a primary current system in which there is a fuel cell device; and
   a secondary current system in which there is a battery which has an operating voltage range limited by a maximum voltage and by a minimum voltage and which has an operating current strength range for supplying current to the at least one consumer,
   wherein an open circuit voltage of the fuel cell device corresponds at most to the maximum voltage of the battery,
   wherein the primary current system is connected to the secondary current system without a voltage converter,
   wherein a frost-starting element is provided in the primary current system and is designed to bring about automatic heating of the fuel cell device,
   wherein the frost starting element is a Z diode, and
   wherein the frost-starting element is connected in parallel to the fuel cell device and is designed to withdraw a current from the fuel cell device to lower the fuel cell voltage below a voltage limit value.

2. The supply device according to claim 1, wherein the primary current system has a first primary current system connection and a second primary current system connection, the frost-starting element is connected to the first primary current system connection at a first end and to the second primary current system connection at a second end, the secondary current system has a first secondary current system connection and a second secondary current system connection, and the first primary current system connection and the first secondary current system connection are connected via a blocking diode and the second primary current system connection and the second secondary current system connection are connected directly to one another.

3. The supply device according to claim 1, wherein the battery has a specific number of battery cells and/or the fuel cell device has a specific number of fuel cells, wherein the number of battery cells and/or the number of fuel cells is selected such that the open-circuit voltage of the fuel cell device corresponds to the maximum voltage.

4. The supply device according to claim 1, wherein the frost-starting element is a high-voltage resistor that can be switched on and off.

5. The supply device according to claim 1, wherein the frost-starting element is a PTC heating element.

6. A supply device for electrical supply of at least one consumer, said supply device comprising:
   a primary current system in which there is a fuel cell device; and
   a secondary current system in which there is a battery which has an operating voltage range limited by a maximum voltage and by a minimum voltage and which has an operating current strength range for supplying current to the at least one consumer,
   wherein an open circuit voltage of the fuel cell device corresponds at most to the maximum voltage of the battery,
   wherein the primary current system is connected to the secondary current system without a voltage convener,
   wherein a frost-starting element is provided in the primary current system and is designed to bring about automatic heating of the fuel cell device,
   wherein the frost-starting element is a power semiconductor switch operable in a linear mode, and
   wherein the frost-starting element is connected in parallel to the fuel cell device and is designed to withdraw a current from the fuel cell device to lower the fuel cell voltage below a voltage limit value.

7. A method for frost-starting a fuel cell device of a supply device including a primary current system in which there is a fuel cell device and a secondary current system in which there is a battery which has an operating voltage range limited by a maximum voltage and by a minimum voltage and which has an operating current strength range for supplying current to the at least one consumer, wherein an open circuit voltage of the fuel cell device corresponds at most to the maximum voltage of the battery, wherein the primary current system is connected to the secondary current system without a voltage converter, wherein a frost-starting element is provided in the primary current system and is designed to bring about automatic heating of the fuel cell device, and wherein the frost-starting element is connected in parallel to the fuel cell device and is designed to withdraw a current from the fuel cell device to lower the fuel cell voltage below a voltage limit value, the method comprising:
   determining a condition of a frost start when an ambient temperature is below 5° C.;
   lowering a fuel cell voltage below the voltage limit value by activating the frost-starting element connected in parallel to the fuel cell device in a frost-start operation; and
   deactivating the frost-starting element upon reaching a normal temperature and thus switching to normal operation of the fuel cell device,
   wherein the frost-starting element is a Z diode.

8. The method according to claim 7, wherein the condition of a frost start is determined by means of a temperature sensor of a vehicle.

* * * * *

UNITED STATES PATENT AND TRADEMARK OFFICE
CERTIFICATE OF CORRECTION

| | |
|---|---|
| PATENT NO. | : 11,508,977 B2 |
| APPLICATION NO. | : 16/965937 |
| DATED | : November 22, 2022 |
| INVENTOR(S) | : Martin Breu et al. |

It is certified that error appears in the above-identified patent and that said Letters Patent is hereby corrected as shown below:

In the Claims

<u>Column 7, Claim 1, Line 36:</u>
"the frost starting element"
Should read:
--the frost-starting element--.

<u>Column 8, Claim 6, Line 19:</u>
"voltage convener,"
Should read:
--voltage converter,--.

Signed and Sealed this
Twenty-ninth Day of October, 2024

Katherine Kelly Vidal
*Director of the United States Patent and Trademark Office*